United States Patent
Obitsu (10) Patent No.: US 10,532,732 B2
(45) Date of Patent: Jan. 14, 2020

(54) HYBRID VEHICLE AND CONTROL METHOD THEREFOR

(71) Applicant: TOYOTA JIDOSHA KABUSHIKI KAISHA, Toyota-shi, Aichi-ken (JP)

(72) Inventor: Mitsuhiro Obitsu, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 90 days.

(21) Appl. No.: 15/963,463

(22) Filed: Apr. 26, 2018

(65) Prior Publication Data

US 2018/0312160 A1    Nov. 1, 2018

(30) Foreign Application Priority Data

Apr. 27, 2017    (JP) .................. 2017-088497

(51) Int. Cl.
| | | |
|---|---|---|
| *B60W 20/15* | (2016.01) | |
| *B60W 10/08* | (2006.01) | |
| *B60W 10/115* | (2012.01) | |
| *B60W 10/30* | (2006.01) | |
| *B60W 30/188* | (2012.01) | |

(Continued)

(52) U.S. Cl.
CPC ............ *B60W 20/15* (2016.01); *B60W 10/06* (2013.01); *B60W 10/08* (2013.01); *B60W 10/115* (2013.01); *B60W 10/30* (2013.01); *B60W 30/188* (2013.01); *H02P 5/74* (2013.01); *B60K 6/365* (2013.01); *B60K 6/46* (2013.01); *B60W 2510/18* (2013.01); *B60W 2540/10* (2013.01); *B60W 2710/086* (2013.01); *B60Y 2200/92* (2013.01); *B60Y 2300/188* (2013.01); *B60Y 2300/60* (2013.01); *H02M 7/5387* (2013.01);

(Continued)

(58) Field of Classification Search
CPC ...................................................... B60W 20/15
See application file for complete search history.

(56) References Cited

U.S. PATENT DOCUMENTS

| | | | |
|---|---|---|---|
| 7,766,788 B2 * | 8/2010 | Shamoto ................ | B60K 6/365 477/3 |
| 7,997,364 B2 * | 8/2011 | Hashimoto ........... | B60W 20/10 180/65.265 |

(Continued)

FOREIGN PATENT DOCUMENTS

JP        2013-203116 A        10/2013

OTHER PUBLICATIONS

U.S. Appl. No. 15/922,319, filed Mar. 15, 2018 Inventor: Daiki Takayama Title: Hybrid Vehicle and Control Method Therefor.

(Continued)

*Primary Examiner* — Alex C Dunn
(74) *Attorney, Agent, or Firm* — Sughrue Mion, PLLC (57) ABSTRACT

When an accelerator is turned on in a braking state in which the accelerator is turned off during predetermined traveling and a braking torque is output from a first motor to a drive shaft via a planetary gear set with negative rotation of the first motor and with a counter electromotive voltage of the first motor higher than a voltage of power lines on a high voltage side, a step-up and step-down converter and an engine are controlled such that a voltage of the power lines on the high voltage side increases and a rotation speed of the first motor increases in comparison with a case in which the accelerator is turned off.

4 Claims, 7 Drawing Sheets

(51) Int. Cl.
*H02P 5/74* (2006.01)
*B60W 10/06* (2006.01)
*B60K 6/46* (2007.10)
*B60K 6/365* (2007.10)
*H02M 7/5387* (2007.01)

(52) U.S. Cl.
CPC ......... *H02P 2201/07* (2013.01); *Y10S 903/93* (2013.01)

(56) References Cited

U.S. PATENT DOCUMENTS

| | | | | |
|---|---|---|---|---|
| 7,999,499 | B2* | 8/2011 | Tanaka | B60W 20/50 318/434 |
| 8,256,547 | B2* | 9/2012 | Ichikawa | B60L 58/24 180/65.29 |
| 8,506,448 | B2* | 8/2013 | Hokoi | B60L 50/61 477/3 |
| 8,631,887 | B2* | 1/2014 | Teraya | F02D 41/1495 180/65.28 |
| 8,669,855 | B2* | 3/2014 | Suzuki | B60L 50/16 340/438 |
| 8,683,244 | B2* | 3/2014 | Minegishi | B60L 50/16 713/320 |
| 8,818,595 | B2* | 8/2014 | Tamagawa | B60K 6/442 701/22 |
| 8,909,399 | B2* | 12/2014 | Kato | B60K 6/365 701/22 |
| 9,327,591 | B2* | 5/2016 | Yamamoto | B60K 6/445 |
| 9,493,150 | B2* | 11/2016 | Endo | B60K 6/46 |
| 9,527,507 | B2* | 12/2016 | Oba | B60W 20/50 |
| 9,709,444 | B2* | 7/2017 | Nozawa | G01K 3/10 |
| 10,086,825 | B2* | 10/2018 | Shimizu | B60L 58/12 |
| 10,093,305 | B2* | 10/2018 | Shimizu | B60W 20/14 |
| 2016/0114788 | A1* | 4/2016 | Kamatani | B60K 6/445 701/22 |
| 2017/0088127 | A1* | 3/2017 | Matsumura | B60L 50/16 |
| 2018/0222329 | A1* | 8/2018 | Shimizu | B60L 50/16 |
| 2018/0304881 | A1* | 10/2018 | Okabe | B60W 20/15 |

OTHER PUBLICATIONS

U.S. Appl. No. 15/922,316, filed Mar. 15, 2018 Inventor: Daiki Takayama Title: Hybrid Vehicle and Control Method Therefor.

* cited by examiner

HYBRID VEHICLE AND CONTROL METHOD THEREFOR

CROSS-REFERENCE TO RELATED APPLICATIONS

The disclosure of Japanese Patent Application No. 2017-088497 filed on Apr. 27, 2017 including the specification, drawings and abstract is incorporated herein by reference in its entirety.

BACKGROUND

1. Technical Field

The disclosure relates to a hybrid vehicle and a control method therefor, and more particularly, to a hybrid vehicle that includes an engine, a planetary gear set, two motors, two inverters, a power storage device, and a step-up and step-down converter and a control method therefor.

2. Description of Related Art

In the related art, a hybrid vehicle including an engine, a first motor, a planetary gear mechanism in which the engine, the first motor, and an output member connected to driving wheels are connected to a carrier, a sun gear, and a ring gear thereof, a second motor that is connected to the output member, an inverter that drives the first motor and the second motor, and a battery that is connected to the inverter via power lines has been proposed (for example, see Japanese Unexamined Patent Application Publication No. 2013-203116 (JP 2013-203116 A)). In this hybrid vehicle, when the hybrid vehicle is traveling with the gate of the inverter cut off and with the engine operating and an accelerator is turned on, the engine is controlled such that a counter electromotive voltage which is generated with rotation of the first motor becomes higher than a DC-side voltage of the inverter based on a DC-side voltage of the inverter, a rotation speed of the output member, and an accelerator operation amount. Through this control, a braking torque based on the counter electromotive voltage of the first motor is adjusted and a reaction torque (a driving torque generated in the output member) with respect to the braking torque is adjusted. In the hybrid vehicle, when the accelerator is turned off, the engine is controlled such that the counter electromotive voltage of the first motor is equal to or less than the DC-side voltage of the inverter. By this control, a driving torque is prevented from being generated in the output member.

SUMMARY

In the hybrid vehicle, when the hybrid vehicle is traveling with the gate of the inverter cut off and with the engine operating and the accelerator is turned off, a braking torque is generated in the output member from the first motor via the planetary gear mechanism when the first motor rotates negatively and the counter electromotive voltage of the first motor is higher than the DC-side voltage of the inverter. Hereinafter, this state is referred to as a "braking state." When the accelerator is turned on in the braking state, there is demand for rapidly decreasing the braking torque generated in the output member to improve traveling performance.

Therefore, the disclosure provides a hybrid vehicle that can rapidly decrease a braking torque which is output to a drive shaft connected to driving wheels when the hybrid vehicle is traveling with the gate of an inverter cut off and with an engine operating and an accelerator is turned on in a braking state in which the accelerator is turned off and a control method therefor.

According to an aspect of the disclosure, there is provided a hybrid vehicle including an engine, a first motor, a second motor, a planetary gear set, a first inverter, a second inverter, a power storage device, a step-up and step-down converter, and an electronic control unit. The first motor is configured to generate a counter electromotive voltage with rotation of the first motor. The second motor is connected to a drive shaft connected to driving wheels of the hybrid vehicle and is configured to generate a counter electromotive voltage with rotation of the second motor. In the planetary gear set, three rotary elements are connected to three shafts of the first motor, the engine, and the drive shaft such that the first motor, the engine, and the drive shaft are sequentially arranged in the order of the first motor, the engine and the drive shaft in a nomogram. The first inverter is configured to drive the first motor. The second inverter is configured to drive the second motor. The step-up and step-down converter is connected to power lines on a low voltage side and power lines on a high voltage side and is configured to supply and receive electric power to and from the power lines on the low voltage side and the power lines on the high voltage side with change in a voltage between the power lines on the low voltage side and the power lines on the high voltage side. Here, the power lines on the low voltage side are connected to the power storage device and the power lines on the high voltage side are connected to the first inverter and the second inverter. The electronic control unit is configured (i) to control the engine and the step-up and step-down converter such that the counter electromotive voltage of the first motor becomes higher than the voltage of the power lines on the high voltage side and a driving torque is output from the first motor to the drive shaft via the planetary gear set when an accelerator is turned on during predetermined traveling in which the hybrid vehicle is traveling with gates of the first inverter and the second inverter cut off and with the engine operating, and (ii) to control the step-up and step-down converter and the engine such that the voltage of the power lines on the high voltage side increases and a rotation speed of the first motor increases in comparison with a case in which the accelerator is turned off when the accelerator is turned on in a braking state in which the accelerator is turned off during the predetermined traveling and a braking torque is output from the first motor to the drive shaft via the planetary gear set with negative rotation of the first motor and with the counter electromotive voltage of the first motor higher than the voltage of the power lines on the high voltage side.

According to another aspect of the disclosure, there is provided a control method of a hybrid vehicle that performs the following control. The hybrid vehicle includes an engine, a first motor configured to generate a counter electromotive voltage with rotation of the first motor, a second motor connected to a drive shaft connected to driving wheels of the hybrid vehicle and configured to generate a counter electromotive voltage with rotation of the second motor, a planetary gear set of which three rotary elements are connected to three shafts of the first motor, the engine, and the drive shaft such that the first motor, the engine, and the drive shaft are sequentially arranged in the order of the first motor, the engine and the drive shaft in a nomogram, a first inverter configured to drive the first motor, a second inverter configured to drive the second motor, a power storage device, and a step-up and step-down converter connected to power lines on a low voltage side to which the power storage device is connected and power lines on a high voltage side to which the first inverter and the second inverter are connected and configured to supply and receive electric power to and from the power lines on the low voltage side and the power lines on the high voltage side with change in a voltage between the power lines on the low voltage side and the power lines on the high voltage side. The control method includes: (i) controlling the engine and the step-up and step-down converter such that the counter electromotive voltage of the first motor becomes higher than the voltage of the power lines on the high voltage side and a driving torque is output from the first motor to the drive shaft via the planetary gear set when an accelerator is turned on during predetermined traveling in which the hybrid vehicle is traveling with gates of the first inverter and the second inverter cut off and with the engine operating; and (ii) controlling the step-up and step-down converter and the engine such that the voltage of the power lines on the high voltage side increases and a rotation speed of the first motor increases in comparison with a case in which the accelerator is turned off when the accelerator is turned on in a braking state in which the accelerator is turned off during the predetermined traveling and a braking torque is output from the first motor to the drive shaft via the planetary gear set with negative rotation of the first motor and with the counter electromotive voltage of the first motor higher than the voltage of the power lines on the high voltage side.

According to the hybrid vehicle and the control method therefor, when the accelerator is turned on in the braking state in which the accelerator is turned off during the predetermined traveling and a braking torque is output from the first motor to the drive shaft via the planetary gear set with negative rotation of the first motor and with the counter electromotive voltage of the first motor higher than the voltage of the power lines on the high voltage side, the step-up and step-down converter and the engine are controlled such that the voltage of the power lines on the high voltage side increases and a rotation speed of the first motor increases in comparison with a case in which the accelerator is turned off. Accordingly, with the hybrid vehicle and the control method therefor, it is possible to more rapidly decrease a braking torque that is output to the drive shaft by increasing the voltage of the power lines on the high voltage side.

In the hybrid vehicle, the electronic control unit may be configured to control the step-up and step-down converter such that the voltage of the power lines on the high voltage side is equal to or higher than the counter electromotive voltage of the first motor when the accelerator is turned on in the braking state in which the accelerator is turned off during the predetermined traveling. With the hybrid vehicle, a regenerative torque is not generated from the first motor, and a braking torque based on the regenerative torque is not output to the drive shaft.

In the hybrid vehicle, the electronic control unit may be configured: when the accelerator is turned on in the braking state in which the accelerator is turned off during the predetermined traveling, (i) to control the step-up and step-down converter such that the voltage of the power lines on the high voltage side increases in comparison with the voltage of the power lines on the high voltage side in the braking state and to control the engine such that the rotation speed of the first motor increases in comparison with the rotation speed of the first motor in the braking state; and (ii) to control the step-up and step-down converter such that the voltage of the power lines on the high voltage side becomes lower than the counter electromotive voltage of the first motor after the rotation speed of the first motor has reached a predetermined rotation speed. With the hybrid vehicle, a driving torque is output from the first motor to the drive shaft via the planetary gear set and the hybrid vehicle can travel with this torque.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawings.

Figure 1:
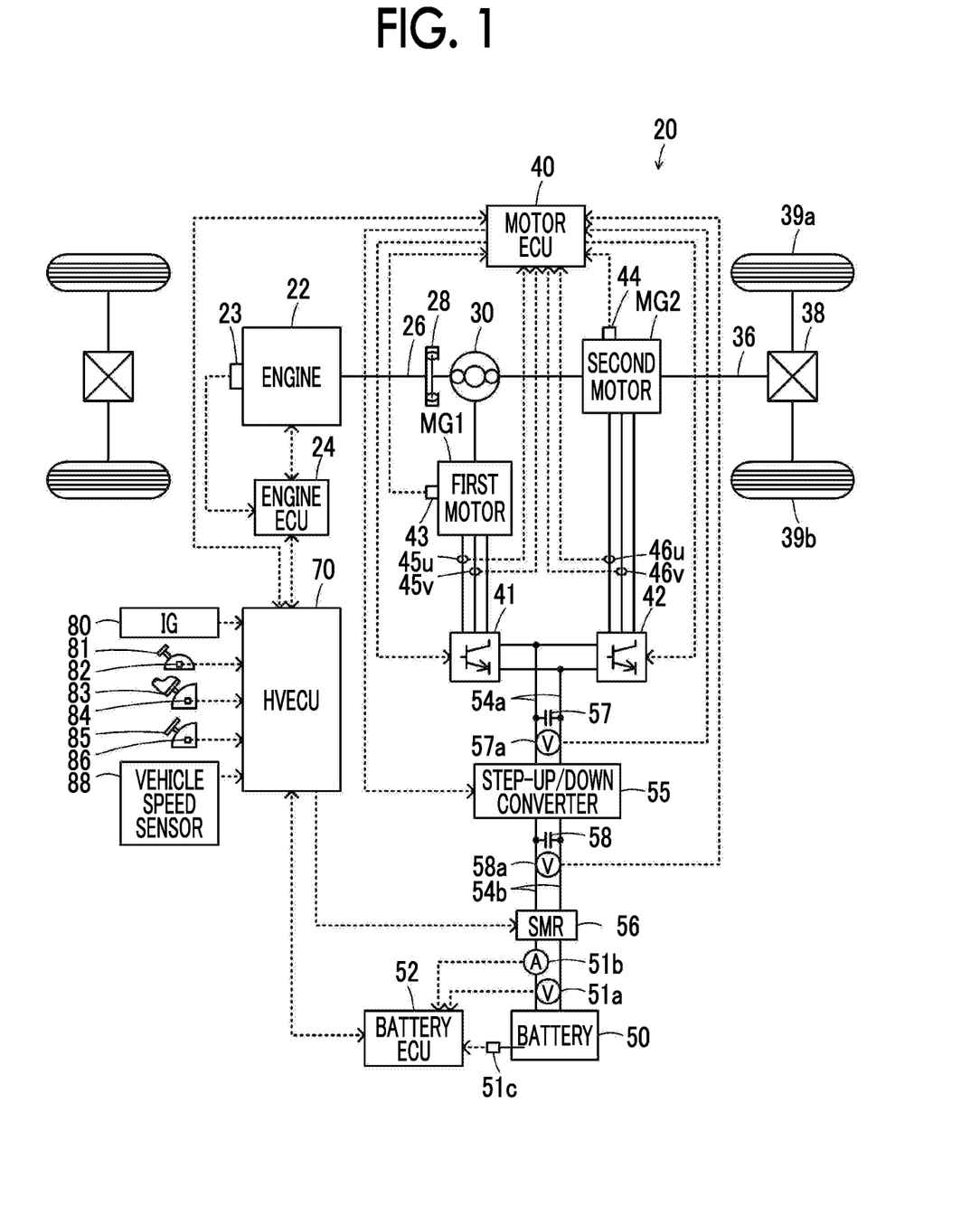
FIG. 1 is a diagram schematically illustrating a configuration of a hybrid vehicle according to an embodiment of the disclosure.
Figure 2:
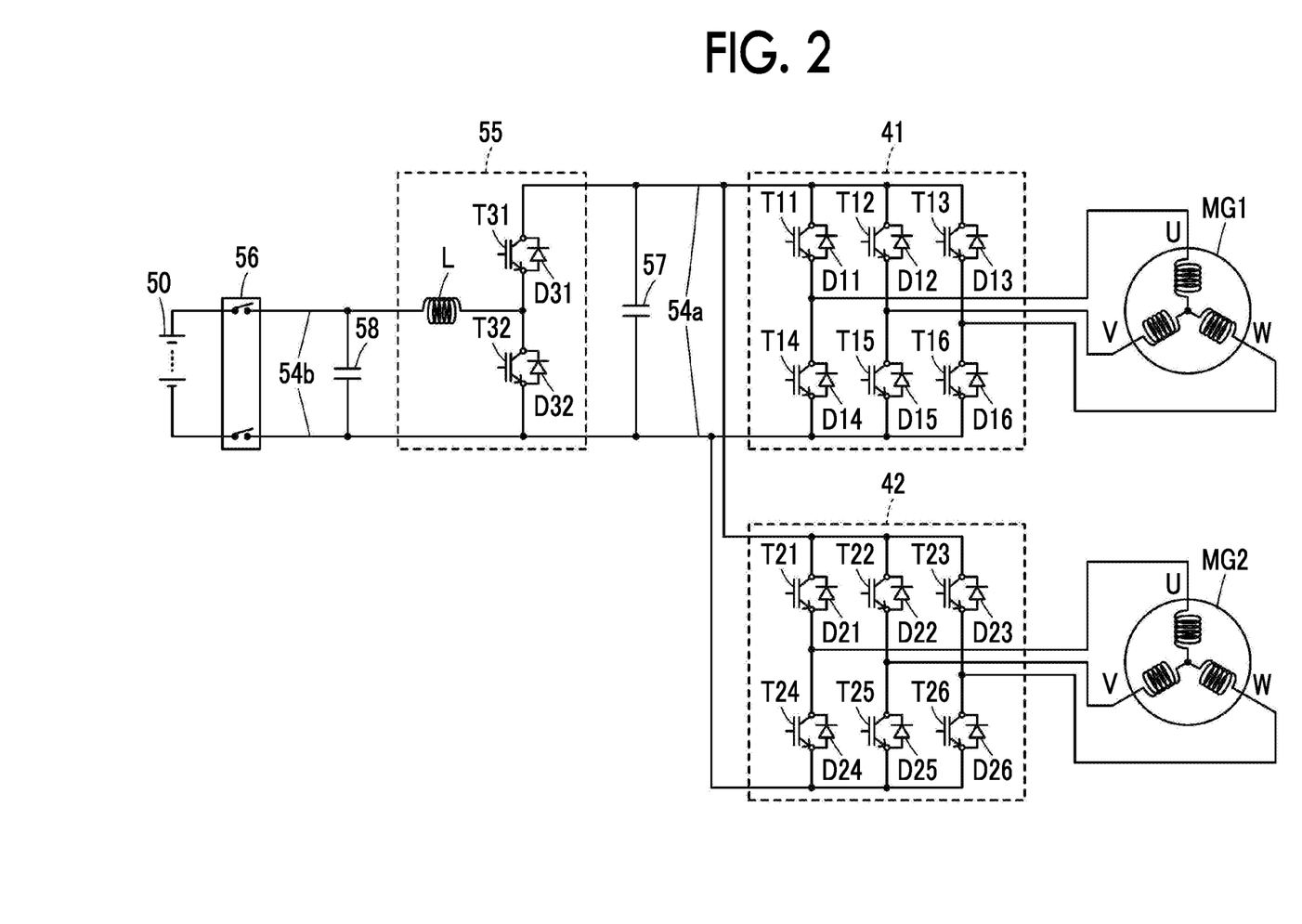
FIG. 2 is a diagram schematically illustrating a configuration of an electrical machinery driving system including a first motor and a second motor illustrated in FIG. 1.

FIG. 1 is a diagram schematically illustrating a configuration of a hybrid vehicle 20 according to an embodiment of the disclosure. FIG. 2 is a diagram schematically illustrating a configuration of an electrical machinery driving system including a first motor MG1 and a second motor MG2. As illustrated in the drawings, the hybrid vehicle 20 according to the embodiment includes an engine 22, a planetary gear set 30, a first motor MG1, a second motor MG2, a first inverter 41, a second inverter 42, a step-up and step-down converter 55, a battery 50 as a power storage device, a system main relay (hereinafter abbreviated to "SMR") 56, and a hybrid electronic control unit (hereinafter referred to as an "HVECU") 70.

The engine 22 is configured as an internal combustion engine that outputs power using gasoline or diesel as fuel and is connected to a carrier of the planetary gear set 30 via a damper 28. Operation of the engine 22 is controlled by an engine electronic control unit (hereinafter referred to as an "engine ECU") 24.

Although not illustrated in the drawings, the engine ECU 24 is configured as a microprocessor such as a CPU, and includes a ROM that stores a processing program, a RAM that temporarily stores data, input and output ports, and a communication port in addition to the CPU. Signals from various sensors which are required for controlling operation of the engine 22, for example, a crank angle θcr from a crank position sensor 23 that detects a rotational position of a crank shaft 26 of the engine 22, are input to the engine ECU 24 via the input port. Various control signals for controlling operation of the engine 22 are output from the engine ECU 24 via the output port. The engine ECU 24 is connected to the HVECU 70 via the communication port. The engine ECU 24 calculates a rotation speed Ne of the engine 22 based on the crank angle θcr from the crank position sensor 23.

The planetary gear set 30 is configured as a single pinion type planetary gear mechanism. A rotor of the first motor MG1 is connected to a sun gear of the planetary gear set 30. A drive shaft 36 connected to driving wheels 39a and 39b via a differential gear 38 is connected to a ring gear of the planetary gear set 30. The crank shaft 26 of the engine 22 is connected to a carrier of the planetary gear set 30 via the damper 28 as described above.

The first motor MG1 is configured as a synchronous generator motor including a rotor that has a permanent magnet embedded therein and a stator on which three-phase coils are wound, and the rotor thereof is connected to the sun gear of the planetary gear set 30 as described above. The second motor MG2 is configured as a synchronous generator motor similarly to the first motor MG1 and a rotor thereof is connected to the drive shaft 36.

The first inverter 41 and the second inverter 42 are used to drive the first motor MG1 and the second motor MG2. As illustrated in FIG. 2, the first inverter 41 is connected to power lines 54a on a high voltage side and includes six transistors T11 to T16 and six diodes D11 to D16 that are connected in parallel to the six transistors T11 to T16. The transistors T11 to T16 are arranged in pairs of two transistors to serve as a source side and a sink side with respect to a positive electrode line and a negative electrode line of the power lines 54a on the high voltage side. Each junction between the transistors constituting a pair in the transistors T11 to T16 is connected to the corresponding three-phase coil (a U phase, a V phase, or a W phase) of the first motor MG1. Accordingly, when a voltage is applied to the first inverter 41, an ON-time ratio of the transistors T11 to T16 constituting each pair is adjusted by a motor electronic control unit (hereinafter referred to as a "motor ECU") 40, whereby a rotating magnetic field is formed in the three-phase coils and the first motor MG1 is rotationally driven. Similarly to the first inverter 41, the second inverter 42 is connected to the power lines 54a on the high voltage side and includes six transistors T21 to T26 and six diodes D21 to D26. When a voltage is applied to the second inverter 42, an ON-time ratio of the transistors T21 to T26 constituting each pair is adjusted by the motor ECU 40, whereby a rotating magnetic field is formed in the three-phase coils and the second motor MG2 is rotationally driven.

The step-up and step-down converter 55 is connected to the power lines 54a on the high voltage side and power lines 54b on a low voltage side and includes two transistors T31 and T32, two diodes D31 and D32 that are connected in parallel to the two transistors T31 and T32, and a reactor L. The transistor T31 is connected to the positive electrode line of the power lines 54a on the high voltage side. The transistor T32 is connected to the transistor T31 and the negative electrode lines of the power lines 54a on the high voltage side and the power lines 54b on the low voltage side. The reactor L is connected to a junction point between the transistors T31 and T32 and the positive electrode line of the power lines 54b on the low voltage side. When an ON-time ratio of the transistors T31 and T32 is adjusted by the motor ECU 40, the step-up and step-down converter 55 steps up electric power of the power lines 54b on the low voltage side and supplies the stepped-up power to the power lines 54a on the high voltage side or steps down electric power of the power lines 54a on the high voltage side and supplies the stepped-down power to the power lines 54b on the low voltage side. A smoothing capacitor 57 is attached to the positive electrode line and the negative electrode line of the power lines 54a on the high voltage side, and a smoothing capacitor 58 is attached to the positive electrode line and the negative electrode line of the power lines 54b on the low voltage side.

Although not illustrated in the drawings, the motor ECU 40 is configured as a microprocessor such as a CPU, and includes a ROM that stores a processing program, a RAM that temporarily stores data, input and output ports, and a communication port in addition to the CPU. As illustrated in FIG. 1, signals from various sensors which are required for controlling operation of the first motor MG1, the second motor MG2, and the step-up and step-down converter 55 are input to the motor ECU 40 via the input port. Examples of the signals input to the motor ECU 40 include a rotational position θm1 and a rotational position θm2 from a first rotational position sensor 43 and a second rotational position sensor 44 that detect rotational positions of the rotors of the first motor MG1 and the second motor MG2 and phase currents Iu1, Iv1, Iu2, and Iv2 from current sensors 45u, 44v, 46u, and 46v that detect currents flowing in the phases of the first motor MG1 and the second motor MG2. Examples thereof further include a voltage (a voltage on a high voltage side) VH of the capacitor 57 (the power lines 54a on the high voltage side) from a voltage sensor 57a that is attached between the terminals of the capacitor 57 and a voltage (a voltage on a low voltage side) VL of the capacitor 58 (the power lines 54b on the low voltage side) from a voltage sensor 58a that is attached between the terminals of the capacitor 58. Various control signals for controlling operation of the first motor MG1, the second motor MG2, and the step-up and step-down converter 55 are output from the motor ECU 40 via the output port. Examples of the signals output from the motor ECU 40 include switching control signals for the transistors T11 to T16 and T21 to T26 of the first inverter 41 and the second inverter 42 and switching control signals for the transistor T31 and the transistor T32 of the step-up and step-down converter 55. The motor ECU 40 is connected to the HVECU 70 via the communication port. The motor ECU 40 calculates electrical angles θe1 and θe2, angular velocities ωm1 and ωm2, and rotation speeds Nm1 and Nm2 of the first motor MG1 and the second motor MG2 based on the rotational position θm1 and the rotational position θm2 of the rotors of the first motor MG1 and the second motor MG2 from the first rotational position sensor 43 and the second rotational position sensor 44.

The battery 50 is configured, for example, as a lithium-ion secondary battery or a nickel-hydride secondary battery with a rated voltage of 200 V and is connected to the power lines 54b on the low voltage side. The battery 50 is controlled by a battery electronic control unit (hereinafter referred to as a "battery ECU") 52.

Although not illustrated in the drawings, the battery ECU 52 is configured as a microprocessor such as a CPU, and includes a ROM that stores a processing program, a RAM that temporarily stores data, input and output ports, and a communication port in addition to the CPU. Signals from various sensors which are required for managing the battery 50 are input to the battery ECU 52 via the input port. Examples of the signals input to the battery ECU 52 include a voltage Vb of the battery 50 from a voltage sensor 51a that is attached between the terminals of the battery 50, a current Ib of the battery 50 from a current sensor 51b that is attached to the output terminal of the battery 50, and a temperature Tb of the battery 50 from a temperature sensor 51c that is attached to the battery 50. The battery ECU 52 is connected to the HVECU 70 via the communication port. The battery ECU 52 calculates a state of charge SOC based on an integrated value of the current Ib of the battery 50 from the current sensor 51b. The state of charge SOC refers to a ratio of capacity of electric power which can be discharged from the battery 50 to the total capacity of the battery 50.

The system main relay 56 is disposed closer to the battery 50 than the capacitor 58 in the power lines 54b on the low voltage side. When ON and OFF thereof is controlled by the HVECU 70, the system main relay 56 connects or disconnects the battery 50 and the step-up and step-down converter 55.

Although not illustrated in the drawings, the HVECU 70 is configured as a microprocessor such as a CPU, and includes a ROM that stores a processing program, a RAM that temporarily stores data, input and output ports, and a communication port in addition to the CPU. Signals from various sensors are input to the HVECU 70 via the input port. Examples of the signals input to the HVECU 70 include an ignition signal from an ignition switch 80 and a shift position SP from a shift position sensor 82 that detects an operation position of a shift lever 81. Examples thereof further include an accelerator operation amount Acc from an accelerator pedal position sensor 84 that detects an amount of depression of an accelerator pedal 83, a brake pedal position BP from a brake pedal position sensor 86 that detects an amount of depression of a brake pedal 85, and a vehicle speed V from a vehicle speed sensor 88. Examples of the shift position SP include a parking position (a P position), a reverse position (an R position), a neutral position (an N position), and a drive position (a D position). As described above, the HVECU 70 is connected to the engine ECU 24, the motor ECU 40, and the battery ECU 52 via the communication port.

In the hybrid vehicle 20 having the above-mentioned configuration, a required driving force of the drive shaft 36 is set based on the accelerator operation amount Acc and the vehicle speed V, and operations of the engine 22, the first motor MG1, and the second motor MG2 are controlled such that a required power corresponding to the required driving force is output to the drive shaft 36. Operation modes of the engine 22, the first motor MG1, and the second motor MG2 include, for example, following Modes (1) to (3). (1) Torque-conversion operation mode: A mode in which operation of the engine 22 is controlled such that power corresponding to the required power is output from the engine 22 and operations of the planetary gear set 30, the first motor MG1, and the second motor MG2 are controlled such that total power output from the engine 22 is torque-converted by the planetary gear set 30, the first motor MG1, and the second motor MG2 and the required power is output to the drive shaft 36. (2) Charging-discharging operation mode: A mode in which operation of the engine 22 is controlled such that power corresponding to the sum of the required power and electric power required for charging-discharging of the battery 50 is output from the engine 22, and driving of the first motor MG1 and the second motor MG2 is controlled such that total or some power output from the engine 22 is torque-converted by the planetary gear set 30, the first motor MG1, and the second motor MG2 with charging-discharging of the battery 50 and the required power is output to the drive shaft 36. (3) Motor operation mode: A mode in which operation of the engine 22 is stopped and driving of the second motor MG2 is controlled such that the required power is output to the drive shaft 36.

In the hybrid vehicle 20 according to the embodiment, when an abnormality occurs in the first inverter 41, the second inverter 42, or the sensors (such as the current sensors 45u, 44v, 46u, and 46v) which are used for controlling the first inverter 41 and the second inverter 42 during operating (rotating) of the engine 22, the hybrid vehicle travels by inverterless traveling (traveling in a limp home mode) with the gates of the first inverter 41 and the second inverter 42 cut off (all the transistors T11 to T16 and T21 to T26 are turned off) and with the engine 22 operating. Hereinafter, basic operations when an accelerator is turned on and the accelerator is turned off during inverterless traveling will be described.

Basic operations when an accelerator is turned on during inverterless traveling will be described below. At this time, the HVECU 70 sets a target rotation speed Nm1* of the first motor MG1 to a predetermined rotation speed Nm1set and sets a target voltage VH* of the power lines 54a on the high voltage side to a predetermined voltage VHset1 such that the counter electromotive voltage Vcef1 generated with rotation of the first motor MG1 is higher than the voltage VH of the power lines 54a on the high voltage side. Here, the counter electromotive voltage Vcef1 of the first motor MG1 corresponds to a product of the angular velocity ωm1 and a counter electromotive voltage constant Km1 of the first motor MG1. The predetermined rotation speed Nm1set and the predetermined voltage VHset1 are determined in advance by experiment or analysis. For example, 4000 rpm, 5000 rpm, or 6000 rpm can be used as the predetermined rotation speed Nm1set. For example, 330 V, 350 V, or 370 V can be used as the predetermined voltage VHset1.

Subsequently, the target rotation speed Ne* of the engine 22 is calculated by Equation (1) using the target rotation speed Nm1* of the first motor MG1, the rotation speed Nm2 of the second motor MG2 (the rotation speed Nd of the drive shaft 36), and a gear ratio ρ (the number of teeth of the sun gear/the number of teeth of the ring gear) of the planetary gear set 30, the target rotation speed Ne* is transmitted to the engine ECU 24, the target voltage VH* of the power lines 54a on the high voltage side is transmitted to the motor ECU 40. A value which is calculated based on the rotational position θm2 of the rotor of the second motor MG2 detected by the second rotational position sensor 44 can be input from the motor ECU 40 by communication and can be used as the rotation speed Nm2 of the second motor MG2. When the target rotation speed Ne* of the engine 22 is received, the engine ECU 24 performs intake air control, fuel injection control and ignition control of the engine 22 such that the rotation speed Ne of the engine 22 reaches the target rotation speed Ne*. When the target voltage VH* of the power lines 54a on the high voltage side is received, the motor ECU 40 performs switching control of the transistors T31 and T32 of the step-up and step-down converter 55 such as the voltage VH of the power lines 54a on the high voltage side reaches the target voltage VH*.

$$Ne^* = (Nm1^* \times \rho + Nm2)/(1+\rho) \quad (1)$$

Figure 3:
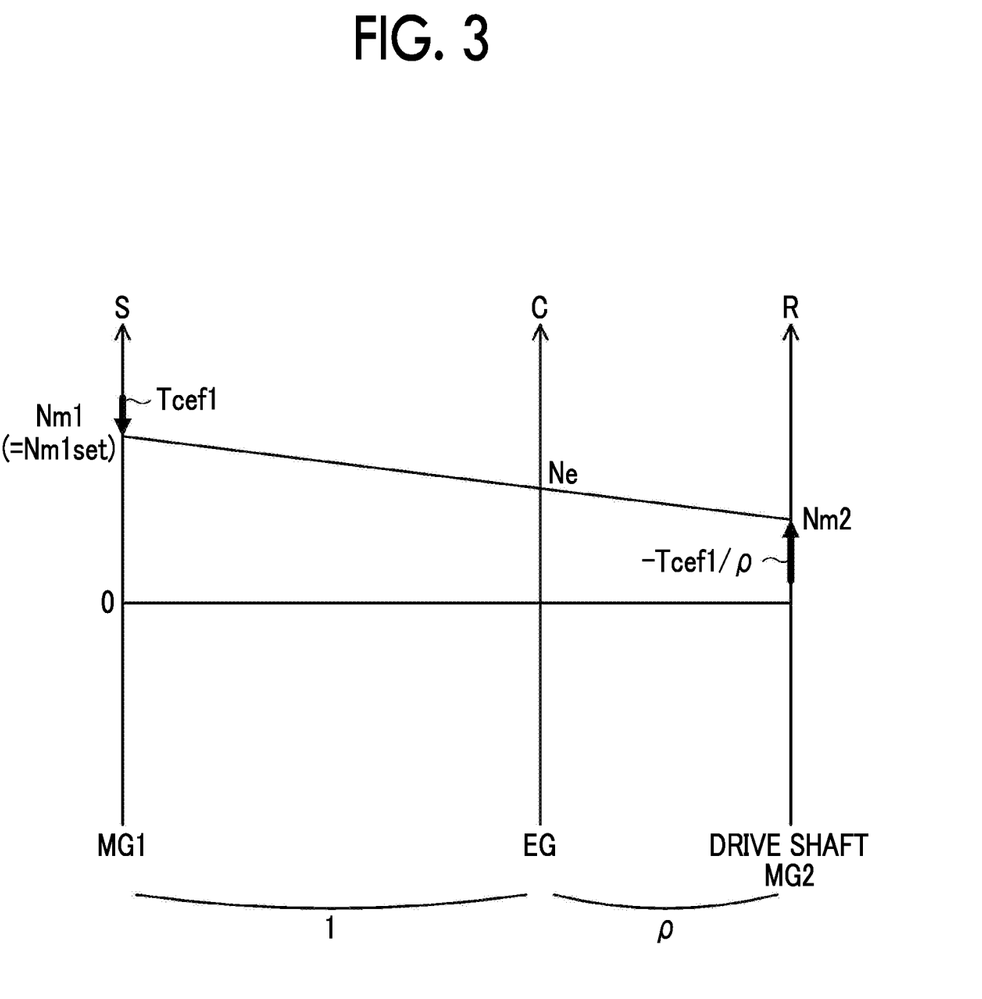
FIG. 3 is a diagram illustrating an example of a nomogram of a planetary gear set when the first motor rotates positively and a counter electromotive voltage of the first motor is higher than a voltage of power lines on a high voltage side during inverterless traveling of the hybrid vehicle according to the embodiment.

FIG. 3 is a diagram illustrating an example of a nomogram of the planetary gear set 30 when the first motor MG1 rotates positively and the counter electromotive voltage Vcef1 of the first motor MG1 is higher than the voltage VH of the power lines 54a on the high voltage side during inverterless traveling. In the drawing, an S axis on the left side represents a rotation speed of the sun gear of the planetary gear set 30 which is the rotation speed Nm1 of the first motor MG1, a C axis represents a rotation speed of the carrier of the planetary gear set 30 which is the rotation speed Ne of the engine 22, and an R axis represents a rotation speed of the ring gear of the planetary gear set 30 which is the rotation speed Nm2 of the second motor MG2 (and the rotation speed Nd of the drive shaft 36). Equation (1) can be easily derived using FIG. 3.

When the accelerator is turned on during inverterless traveling, a regenerative torque Tcef1 is generated in the first motor MG1 by setting the state illustrated in FIG. 3, a reaction torque (−Tcef1/ρ) with respect to the regenerative torque Tcef1 is output as a driving torque (a torque for forward movement) to the drive shaft 36, and the hybrid vehicle can travel with the torque. Here, the regenerative torque Tcef1 of the first motor MG1 is generated, when the first motor MG1 rotates by interlocking with the operation of the engine 22 and electric power based on the counter electromotive voltage Vcef1 of the first motor MG1 is rectified by the diodes D11 to D16 of the first inverter 41 and is supplied to the battery 50 via the power lines 54a on the high voltage side, the step-up and step-down converter 55, and the power lines 54b on the lower voltage side.

Although not illustrated in FIG. 3, a regenerative torque Tcef2 is generated from the second motor MG2 and the regenerative torque Tcef2 is output as a braking torque to the drive shaft 36 when the counter electromotive voltage Vcef2 of the second motor MG2 is higher than the voltage VH of the power lines 54a on the high voltage side because the rotation speed Nm2 of the second motor MG2 (the vehicle speed V) is high. Accordingly, the total torque which is output to the drive shaft 36 (the sum torque of the torque which is output from the first motor MG1 to the drive shaft 36 via the planetary gear set 30 and the torque which is output from the second motor MG2 to the drive shaft 36) is less than that when the counter electromotive voltage Vcef2 of the second motor MG2 is equal to or less than the voltage VH of the power lines 54a on the high voltage side. The counter electromotive voltage Vcef2 of the second motor MG2 corresponds to a product of the angular velocity ωm2 of the second motor MG2 and a counter electromotive voltage constant Km2. Specifically, the regenerative torque Tcef2 of the second motor MG2 is generated, when electric power based on the counter electromotive voltage Vcef2 of the second motor MG2 is rectified by the diodes D21 to D26 of the second inverter 42 and is supplied to the battery 50 via the power lines 54a on the high voltage side, the step-up and step-down converter 55, and the power lines 54b on the lower voltage side.

Basic operations when the accelerator is turned off during inverterless traveling will be described below. At this time, the HVECU 70 sets the target rotation speed Ne* of the engine 22 to an allowable lower-limit rotation speed Nemin, transmits the set target rotation speed to the engine ECU 24, sets the target voltage VH* of the power lines 54a on the high voltage side to a predetermined voltage VHset2 which is lower than the above-mentioned predetermined voltage VHset1, and transmits the set target voltage to the motor ECU 40. Here, the allowable lower-limit rotation speed Nemin of the engine 22 is a lower limit of a rotation speed range in which the engine 22 can operate autonomously and, for example, 900 rpm, 1000 rpm, or 1100 rpm can be used. The predetermined voltage VHset2 is a rated voltage of the battery 50 or a voltage which is slightly higher than the rated voltage and, for example, 200 V, 220 V, or 240 V can be used. The control of the engine 22 by the engine ECU 24 and the control of the step-up and step-down converter 55 by the motor ECU 40 are the same as described above. Through this control, the rotation speed Nm1 of the first motor GM1 is set to be lower than the rotation speed (the predetermined rotation speed Nm1set) when the accelerator is turned on and the voltage VH of the power lines 54a on the high voltage side is set to be lower than the voltage (the predetermined voltage VHset1) when the accelerator is turned on.

Figure 4:
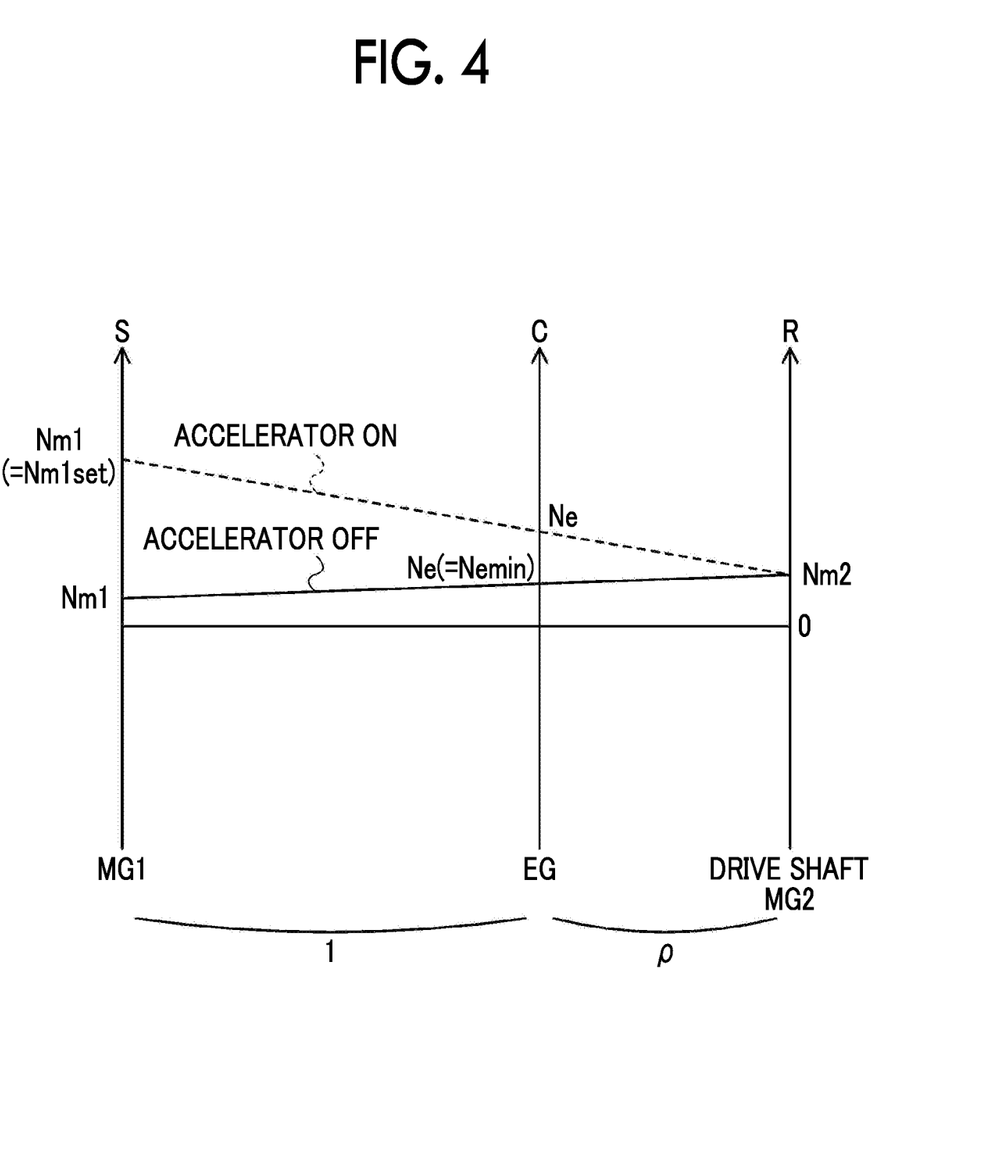
FIG. 4 is a diagram illustrating an example of the nomogram of the planetary gear set when a rotation speed of an engine is an allowable lower-limit rotation speed during inverterless traveling of the hybrid vehicle according to the embodiment.
Figure 5:
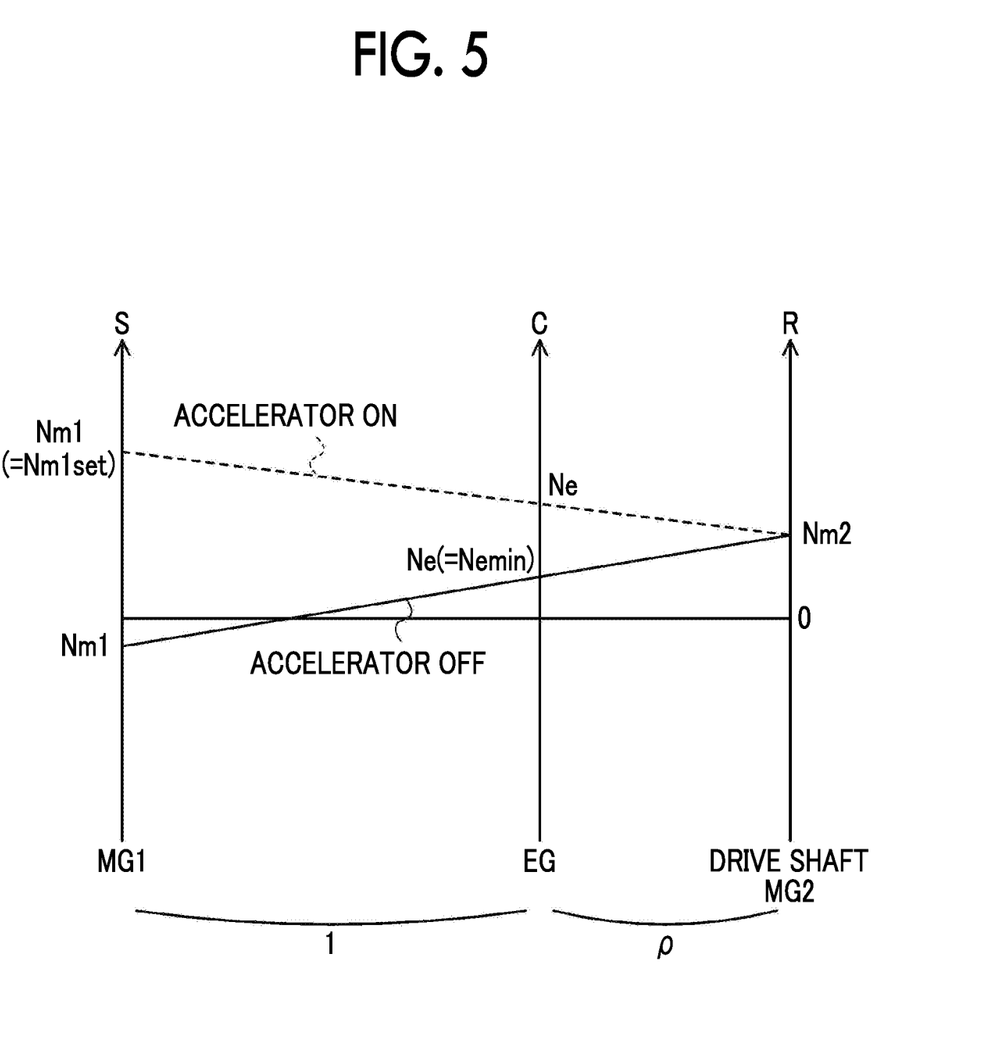
FIG. 5 is a diagram illustrating an example of the nomogram of the planetary gear set when the rotation speed of the engine is the allowable lower-limit rotation speed during inverterless traveling of the hybrid vehicle according to the embodiment.
Figure 6:
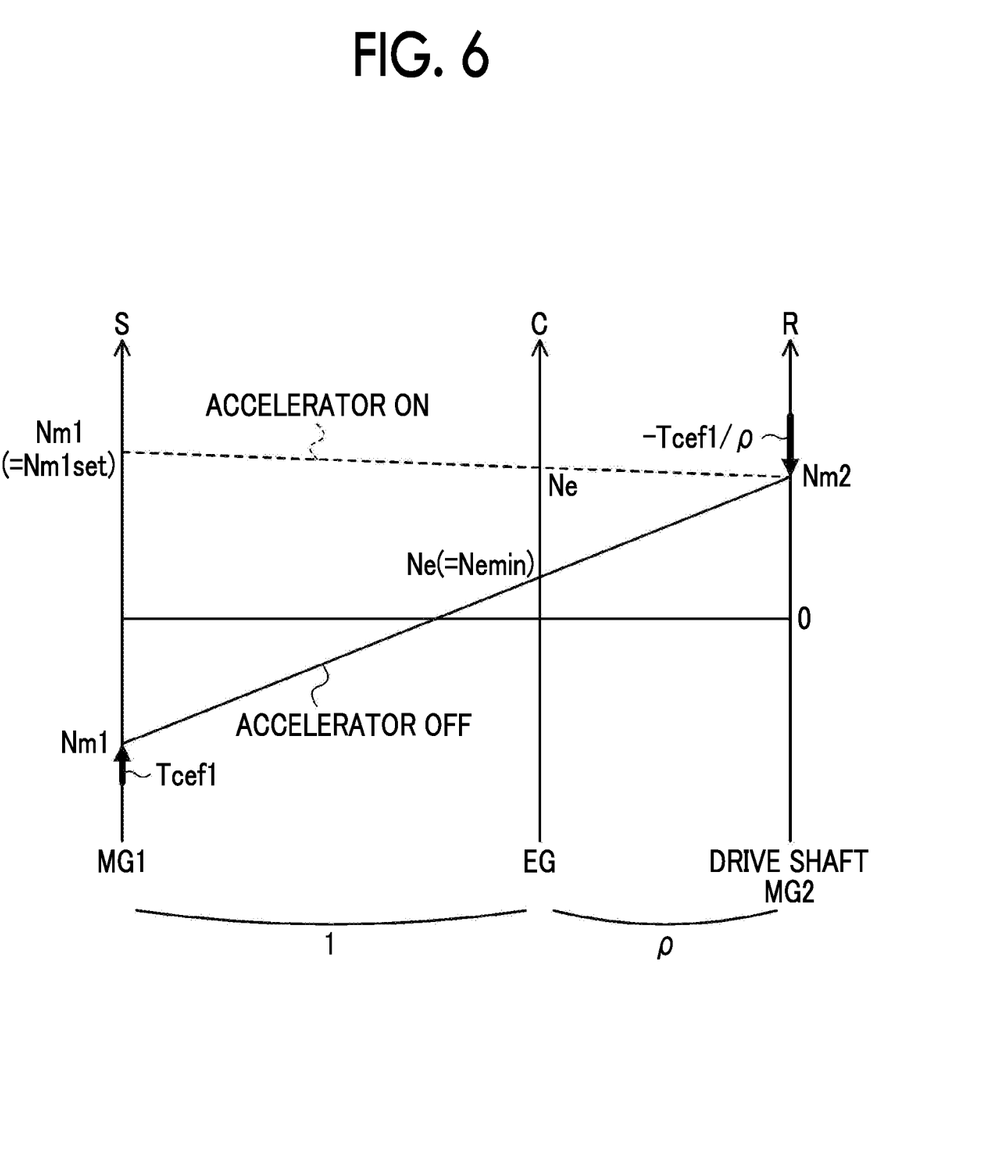
FIG. 6 is a diagram illustrating an example of the nomogram of the planetary gear set when the rotation speed of the engine is the allowable lower-limit rotation speed during inverterless traveling of the hybrid vehicle according to the embodiment.

FIGS. 4 to 6 are diagrams illustrating examples of a nomogram of the planetary gear set 30 when the rotation speed Ne of the engine 22 reaches the allowable lower-limit rotation speed Nemin during inverterless traveling. FIG. 4 illustrates a case in which the first motor MG1 rotates positively and the counter electromotive voltage Vcef1 of the first motor MG1 is equal to or lower than the voltage VH of the power lines 54a on the high voltage side, FIG. 5 illustrates a case in which the first motor MG1 rotates negatively and the counter electromotive voltage Vcef1 of the first motor MG1 is equal to or lower than the voltage VH of the power lines 54a on the high voltage side, and FIG. 6 illustrates a case in which the first motor MG1 rotates negatively and the counter electromotive voltage Vcef1 of the first motor MG1 is higher than the voltage VH of the power lines 54a on the high voltage side. In FIGS. 4 to 6, similarly to FIG. 3, the regenerative torque Tcef2 of the second motor MG2 (which may be generated or may not be generated depending on the magnitude relationship between the rotation speed Nm2 of the second motor MG2 and the voltage VH of the power lines 54a on the high voltage side) is not illustrated. In FIGS. 4 to 6, a state in which the accelerator is turned on during inverterless traveling is indicated by a dotted line for the purpose of reference.

When the accelerator is turned off during inverterless traveling and the rotation speed Ne of the engine 22 is the allowable lower-limit rotation speed Nemin, one of the states illustrated in FIGS. 4 to 6 is set depending on the rotation speed Nm2 of the second motor MG2 (the vehicle speed V). When the state illustrated in FIG. 4 or 5 is set, the regenerative torque Tcef1 can be prevented from being generated from the first motor MG1 and the torque which is output from the first motor MG1 to the drive shaft 36 via the planetary gear set 30 can be decreased. When the state illustrated in FIG. 6 is set, the regenerative torque Tcef1 in a direction opposite to the direction when the accelerator is turned on can be allowed to be generated from the first motor MG1, and a reaction torque (−Tcef1/ρ) with respect to the regenerative torque Tcef1 can be allowed to be output as a braking torque to the drive shaft 36. Hereinafter, the state illustrated in FIG. 6 is referred to as a "braking state."

By setting the voltage VH of the power lines 54a on the high voltage side (the predetermined voltage VHset2) when the accelerator is turned off during inverterless traveling to be lower than the voltage (the predetermined voltage VHset1) when the accelerator is turned on, the regenerative torque Tcef2 is more likely to be generated from the second motor MG2, that is, the regenerative torque Tcef2 is likely to be output as a braking torque to the drive shaft 36, and the regenerative torque Tcef1 is likely to be generated from the first motor MG1, that is, the reaction torque (−Tcef1/ρ) is likely to be output as a braking torque to the drive shaft 36, when the first motor MG1 is rotates negatively. Accordingly, in comparison with a case in which the rotation speed Nm1 of the first motor MG1 is decreased while the voltage VH of the power lines 54a on the high voltage side is maintained at the voltage (the predetermined voltage VHset1) when the accelerator is turned on, the total torque output to the drive shaft 36 is more likely to decrease (is likely to increase as a braking torque). As a result, it is possible to facilitate application of a sufficient braking force to the hybrid vehicle.

Figure 7:
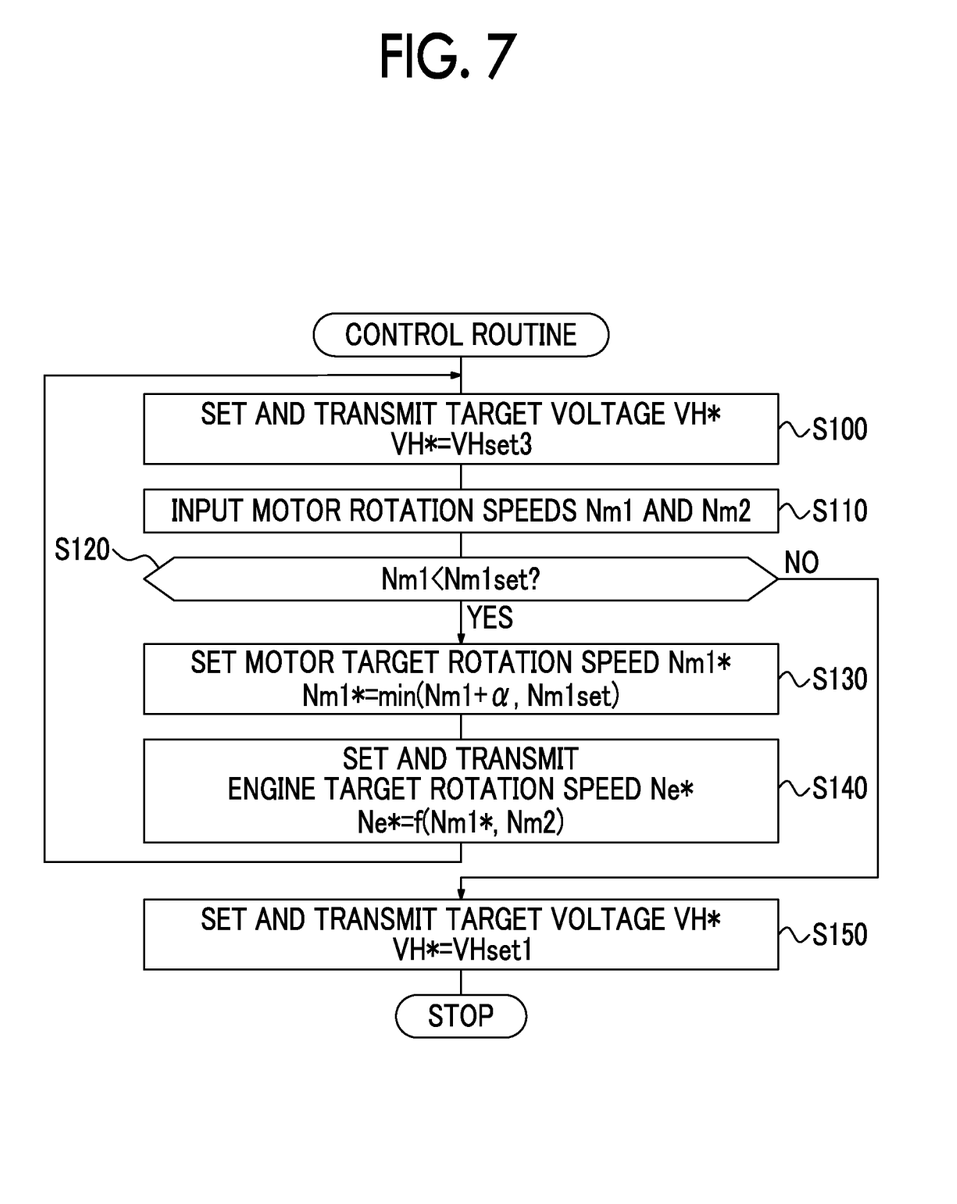
FIG. 7 is a flowchart illustrating an example of a control routine which is performed by a hybrid electronic control unit (HVECU) illustrated in FIG. 1.

Operations of the hybrid vehicle 20 according to the embodiment having the above-mentioned configuration, particularly, operations when the accelerator is turned off during inverterless traveling and the accelerator is turned on in the braking state (see FIG. 6), will be described below. FIG. 7 is a flowchart illustrating an example of a control routine which is performed by the HVECU 70 at that time.

When the control routine illustrated in FIG. 7 is performed, the HVECU 70 sets the target voltage VH* of the power lines 54a on the high voltage side to a predetermined voltage VHset3 which is sufficiently higher than the above-mentioned predetermined voltages VHset1 and VHset2 and transmits the set predetermined voltage to the motor ECU 40 (Step S100). For example, 600 V, 650 V, or 700 V can be used as the predetermined voltage VHset3. The control of the step-up and step-down converter 55 by the motor ECU 40 is the same as described above. By this processing, the regenerative torque Tcef1 can be prevented from being generated from the first motor MG1 and the reaction torque (−Tcef1/ρ) with respect thereto can be prevented from being output as a braking torque to the drive shaft 36. When the regenerative torque Tcef2 is generated from the second motor MG2 immediately before the accelerator is turned on, the regenerative torque Tcef2 can be prevented from being generated and the regenerative torque Tcef2 can be prevented from being output as a braking torque to the drive shaft 36. As a result, it is possible to increase the total torque (decrease the braking torque) which is output to the drive shaft 36.

Subsequently, the rotation speeds Nm1 and Nm2 of the first motor MG1 and the second motor MG2 are input (Step S110), and the input rotation speed Nm1 of the first motor MG1 is compared with the predetermined rotation speed Nm1set (Step S120). Here, as the rotation speeds Nm1 and Nm2 of the first motor MG1 and the second motor MG2, values which are calculated based on the rotational positions of the rotors of the first motor MG1 and the second motor MG2 detected by the first rotational position sensor 43 and the second rotational position sensor 44 are input from the motor ECU 40 by communication.

When it is determined in step S120 that the rotation speed Nm1 of the first motor MG1 is lower than the predetermined rotation speed Nm1set, a value obtained by adding a predetermined rotation speed α to the rotation speed Nm1 of the first motor MG1 is guided with the predetermined rotation speed Nm1 set as an upper limit to set the target rotation speed Nm1* of the first motor MG1 by Equation (2) (Step S130). The target rotation speed Ne* of the engine 22 is set by Equation (1) using the target rotation speed Nm1* of the first motor MG1, the rotation speed Nm2 of the second motor MG2, and the gear ratio ρ of the planetary gear set 30 and is transmitted to the engine ECU 24 (Step S140), and then the control routine returns to Step S110. The control of the engine 22 by the engine ECU 24 is the same described above. By repeatedly performing the processes of Steps S110 to S140, the rotation speed Nm1 of the first motor MG1 is increased to the predetermined rotation speed Nm1set.

$$Nm1^* = \min(Nm1+\alpha, Nm1\text{set}) \quad (2)$$

When it is determined in Step S120 that the rotation speed Nm1 of the first motor MG1 becomes equal to or higher than the predetermined rotation speed Nm1set, the target voltage VH* of the power lines 54a on the high voltage side is set to the predetermined voltage VHset1 and is transmitted to the motor ECU 40 (Step S150), and the control routine ends. The control of the step-up and step-down converter 55 by the motor ECU 40 is the same as described above. By this processing, the voltage VH of the power lines 54a on the high voltage side can be caused to be equal to or lower than the counter electromotive voltage Vcef1 of the first motor MG1. Accordingly, as described above, the reaction torque (−Tcef1/ρ) with respect to the regenerative torque Tcef1 of the first motor MG1 can be output as a driving torque to the drive shaft 36 and the hybrid vehicle can travel with the torque.

In the embodiment, when the accelerator is turned off during inverterless traveling and the accelerator is turned on in the braking state, the following advantages can be achieved by increasing the voltage VH of the power lines 54a on the high voltage side to be higher than the voltage (the predetermined voltage VHset2) when the accelerator is turned off and increasing the rotation speed Nm1 of the first motor MG1. Here, as a comparative example, an example in which the rotation speed Nm1 of the first motor MG1 is increased while the voltage VH of the power lines 54a on the high voltage side is maintained at the voltage when the accelerator is turned off will be considered.

In the comparative example, while the first motor MG1 is rotating negatively, the counter electromotive voltage Vcef1 of the first motor MG1 decreases and the absolute value of the regenerative torque Tcef1 decreases with an increase in the rotation speed Nm1 of the first motor MG1. When the counter electromotive voltage Vcef1 of the first motor MG1 becomes equal to or smaller that the voltage VH of the power lines 54a on the high voltage side, the regenerative torque Tcef1 is not generated from the first motor MG1 and the reaction torque (−Tcef1/ρ) with respect thereto is not output as a braking torque to the drive shaft 36. Since the rotation speed Nm1 of the first motor MG1 (the rotation speed Ne of the engine 22) needs to be increased in this way, the time after the accelerator is turned on and until the reaction torque (−Tcef1/ρ) is not output as a braking torque to the drive shaft 36 may extend slightly. When the regenerative torque Tcef2 is generated from the second motor MG2 immediately before the accelerator is turned on, the regenerative torque Tcef2 continues to be output and the regenerative torque Tcef2 continues to be output as a braking torque to the drive shaft 36 even when the accelerator is turned on. As a result, the time until the braking torque is not output to the drive shaft 36 may extend slightly.

On the other hand, in the embodiment, when the accelerator is turned off and the accelerator is turned off in the braking state, the voltage VH of the power lines 54a on the high voltage side is increased. Accordingly, it is possible to shorten the time until the voltage VH of the power lines 54a on the high voltage side becomes equal to or higher than the counter electromotive voltage Vcef1 of the first motor MG1 and the regenerative torque Tcef1 is not generated from the first motor MG1, that is, the time until the reaction torque (−Tcef1/ρ) is not output as a braking torque to the drive shaft 36. When the regenerative torque Tcef2 is generated from the second motor MG2 immediately before the accelerator is turned on, it is possible to shorten the time until the voltage VH of the power lines 54a on the high voltage side becomes equal to or higher than the counter electromotive voltage Vcef2 of the second motor MG2 and the regenerative torque Tcef2 is not generated, that is, the time until the regenerative torque Tcef2 is not output as a braking torque to the drive shaft 36. As a result, it is possible to more rapidly decrease the braking torque which is output to the drive shaft 36.

In the above-mentioned hybrid vehicle 20 according to the embodiment, when the accelerator is turned off during inverterless traveling and the accelerator is turned on in the braking state, the voltage VH of the power lines 54a on the high voltage side is increased to be higher than that when the accelerator is turned off and the rotation speed Nm1 of the first motor MG1 is increased. By increasing the voltage VH of the power lines 54a on the high voltage side in this way, it is possible to more rapidly decrease the braking torque which is output to the drive shaft 36.

In the hybrid vehicle 20 according to the embodiment, when the accelerator is turned off during inverterless traveling and the accelerator is turned on in the braking state (a state in which the first motor MG1 rotates negatively and the counter electromotive voltage Vcef1 of the first motor MG1 is higher than the voltage VH of the power lines 54a on the high voltage side (the predetermined voltage VHset2)), the voltage VH of the power lines 54a on the high voltage side is increased to a predetermined voltage VHset3 (for example, 600 V, 650 V, or 700 V) which is sufficiently higher than the predetermined voltages VHset1 and VHset2. However, the voltage VH of the power lines 54a on the high voltage side has only to be increased to be higher than the voltage when the accelerator is turned off. For example, the voltage VH of the power lines 54a on the high voltage side may be increased to a voltage which is equal to or slightly higher than the counter electromotive voltage Vcef1 of the first motor MG1 immediately before the accelerator is turned on. The voltage VH of the power lines 54a on the high voltage side may be increased to a voltage which is equal to or slightly higher than the counter electromotive voltage Vcef2 of the second motor MG2 immediately before the accelerator is turned on. The voltage VH of the power lines 54a on the high voltage side may be increased to a voltage which is equal to or slightly higher than the larger one of the counter electromotive voltages Vcef1 and Vcef2 of the first motor MG1 and the second motor MG2 immediately before the accelerator is turned on.

In the hybrid vehicle 20 according to the embodiment, when the accelerator is switched from ON to OFF during inverterless traveling, the voltage VH of the power lines 54a on the high voltage side is decreased from the predetermined voltage VHset1 to the predetermined voltage VHset2. However, the voltage VH of the power lines 54a on the high voltage side may be maintained at the predetermined voltage VHset1. In this case, when the accelerator is turned off and the accelerator is turned on in the braking state, the voltage VH of the power lines 54a on the high voltage side can be set to be higher than the voltage (the predetermined voltage VHset1) when the accelerator is turned off and the rotation speed Nm1 of the first motor MG1 can be increased. When the rotation speed Nm1 of the first motor MG1 becomes equal to or higher than the predetermined rotation speed Nm1set, the voltage VH of the power lines 54a on the high voltage side can be decreased to the predetermined voltage VHset1.

In the hybrid vehicle 20 according to the embodiment, when the accelerator is turned off during inverterless traveling, the target rotation speed Ne* of the engine 22 is set to the allowable lower-limit rotation speed Nemin. However, the target rotation speed Ne* of the engine 22 may be set to a rotation speed which is slightly higher than the allowable lower-limit rotation speed Nemin, for example, a higher rotation speed such as 200 rpm, 300 rpm, or 400 rpm.

In the hybrid vehicle 20 according to the embodiment, when the accelerator is turned on during inverterless traveling, the target rotation speed Nm1* of the first motor MG1 is set to the predetermined rotation speed Nm1set and the target voltage VH* of the power lines 54a on the high voltage side is set to the predetermined voltage VHset. However, the target rotation speed Nm1* of the first motor MG1 and the target voltage VH* of the power lines 54a on the high voltage side may be set such that the absolute value of the regenerative torque Tcef1 of the first motor MG1, that is, the absolute value of the driving torque of the drive shaft 36, increases as the accelerator operation amount Acc increases. For example, it is conceivable that the target rotation speed Nm1* of the first motor MG1 is set to have a tendency to increase as the accelerator operation amount Acc increases.

In the hybrid vehicle 20 according to the embodiment, the battery 50 is used as a power storage device, but any device may be used as long as it is a device that is rechargeable such as a capacitor.

The hybrid vehicle 20 according to the embodiment includes the engine ECU 24, the motor ECU 40, the battery ECU 52, and the HVECU 70, but at least two thereof may be configured as a single electronic control unit.

Correspondence between principal elements of the embodiment and principal elements of the disclosure described in the SUMMARY will be described below. In the embodiment, the engine 22 is an example of the "engine." The first motor MG1 is an example of the "first motor." The planetary gear set 30 is an example of the "planetary gear set." The second motor MG2 is an example of the "second motor." The first inverter 41 is an example of the "first inverter." The second inverter 42 is an example of the "second inverter." The battery 50 is an example of the "power storage device." The step-up and step-down converter 55 is an example of the "step-up and step-down converter." The HVECU 70, the engine ECU 24, and the motor ECU 40 are examples of the "electronic control unit."

The correspondence between the principal elements in the embodiment and the principal elements of the disclosure described in the SUMMARY does not limit the elements of the disclosure described in the SUMMARY, because the embodiment is an example for specifically describing an aspect of the disclosure described in the SUMMARY. That is, it should be noticed that the disclosure described in the SUMMARY has to be construed based on the description of the SUMMARY and the embodiment is only a specific example of the disclosure described in the SUMMARY.

While an embodiment of the disclosure has been described above, the disclosure is not limited to the embodiment and can be modified in various forms without departing from the gist of the disclosure.

The "hybrid vehicle and the control method therefor" according to the disclosure are applicable to industries for manufacturing hybrid vehicles and the like.

What is claimed is:
1. A hybrid vehicle comprising:
an engine;

a first motor configured to generate a counter electromotive voltage with rotation of the first motor;
a second motor connected to a drive shaft connected to driving wheels of the hybrid vehicle and configured to generate a counter electromotive voltage with rotation of the second motor;
a planetary gear set of which three rotary elements are connected to three shafts of the first motor, the engine and the drive shaft such that the first motor, the engine and the drive shaft are sequentially arranged in the order of the first motor, the engine and the drive shaft in a nomogram;
a first inverter configured to drive the first motor;
a second inverter configured to drive the second motor;
a power storage device;
a step-up and step-down converter connected to power lines on a low voltage side and power lines on a high voltage side, the step-up and step-down converter being configured to supply and receive electric power to and from the power lines on the low voltage side and the power lines on the high voltage side with change in a voltage between the power lines on the low voltage side and the power lines on the high voltage side, the power lines on the low voltage side being connected to the power storage device, and the power lines on the high voltage side being connected to the first inverter and the second inverter; and
an electronic control unit configured to:
(i) control the engine and the step-up and step-down converter such that the counter electromotive voltage of the first motor becomes higher than the voltage of the power lines on the high voltage side and a driving torque is output from the first motor to the drive shaft via the planetary gear set when an accelerator is turned on during predetermined traveling in which the hybrid vehicle is traveling with gates of the first inverter and the second inverter cut off and with the engine operating, and
(ii) control the step-up and step-down converter and the engine such that the voltage of the power lines on the high voltage side increases and a rotation speed of the first motor increases in comparison with a case in which the accelerator is turned off when the accelerator is turned on in a braking state in which the accelerator is turned off during the predetermined traveling and a braking torque is output from the first motor to the drive shaft via the planetary gear set with negative rotation of the first motor and with the counter electromotive voltage of the first motor higher than the voltage of the power lines on the high voltage side.

2. The hybrid vehicle according to claim 1, wherein the electronic control unit is configured to control the step-up and step-down converter such that the voltage of the power lines on the high voltage side is equal to or higher than the counter electromotive voltage of the first motor when the accelerator is turned on in the braking state in which the accelerator is turned off during the predetermined traveling.

3. The hybrid vehicle according to claim 1, wherein the electronic control unit is configured to: when the accelerator is turned on in the braking state in which the accelerator is turned off during the predetermined traveling, (i) control the step-up and step-down converter such that the voltage of the power lines on the high voltage side increases in comparison with the voltage of the power lines on the high voltage side in the braking state and to control the engine such that the rotation speed of the first motor increases in comparison with the rotation speed of the first motor in the braking state; and
(ii) control the step-up and step-down converter such that the voltage of the power lines on the high voltage side becomes lower than the counter electromotive voltage of the first motor after the rotation speed of the first motor has reached a predetermined rotation speed.

4. A control method of a hybrid vehicle, the hybrid vehicle including an engine, a first motor configured to generate a counter electromotive voltage with rotation of the first motor, a second motor connected to a drive shaft connected to driving wheels of the hybrid vehicle and configured to generate a counter electromotive voltage with rotation of the second motor, a planetary gear set of which three rotary elements are connected to three shafts of the first motor, the engine and the drive shaft such that the first motor, the engine and the drive shaft are sequentially arranged in the order of the first motor, the engine and the drive shaft in a nomogram, a first inverter configured to drive the first motor, a second inverter configured to drive the second motor, a power storage device, and a step-up and step-down converter connected to power lines on a low voltage side to which the power storage device is connected and power lines on a high voltage side to which the first inverter and the second inverter are connected, and the step-up and step-down converter being configured to supply and receive electric power to and from the power lines on the low voltage side and the power lines on the high voltage side with change in a voltage between the power lines on the low voltage side and the power lines on the high voltage side, the control method comprising:
(i) controlling the engine and the step-up and step-down converter such that the counter electromotive voltage of the first motor becomes higher than the voltage of the power lines on the high voltage side and a driving torque is output from the first motor to the drive shaft via the planetary gear set when an accelerator is turned on during predetermined traveling in which the hybrid vehicle is traveling with gates of the first inverter and the second inverter cut off and with the engine operating, and
(ii) controlling the step-up and step-down converter and the engine such that the voltage of the power lines on the high voltage side increases and a rotation speed of the first motor increases in comparison with a case in which the accelerator is turned off when the accelerator is turned on in a braking state in which the accelerator is turned off during the predetermined traveling and a braking torque is output from the first motor to the drive shaft via the planetary gear set with negative rotation of the first motor and with the counter electromotive voltage of the first motor higher than the voltage of the power lines on the high voltage side.

* * * * *